(12) United States Patent
Mongan et al.

(10) Patent No.: US 6,189,116 B1
(45) Date of Patent: Feb. 13, 2001

(54) COMPLETE, RANDOMLY ORDERED TRAVERSAL OF CYCLIC DIRECTED GRAPHS

(75) Inventors: John Thomas Mongan, Sausalito; Dorothy Mack Cribbs, Mill Valley, both of CA (US)

(73) Assignee: Autodesk, Inc., San Rafael, CA (US)

( * ) Notice: Under 35 U.S.C. 154(b), the term of this patent shall be extended for 0 days.

(21) Appl. No.: 09/114,828

(22) Filed: Jul. 14, 1998

(51) Int. Cl.[7] .............................. H02H 3/05; G06F 15/00; G06F 17/00
(52) U.S. Cl. ............................... 714/38; 714/39; 703/22; 717/4
(58) Field of Search ................. 714/25, 38, 47, 714/48, 50, 39, 37; 703/22; 717/4

(56) References Cited

U.S. PATENT DOCUMENTS

| | | | |
|---|---|---|---|
| 5,414,836 | * | 5/1995 | Baer et al. ........................... 395/575 |
| 5,572,671 | * | 11/1996 | Eisenberg et al. ............. 395/184.01 |
| 5,600,789 | | 2/1997 | Parker et al. ................... 395/183.14 |
| 5,694,539 | * | 12/1997 | Haley et al. ................... 395/183.14 |
| 5,748,497 | * | 5/1998 | Scott et al. ...................... 364/551.01 |
| 5,754,760 | * | 5/1998 | Warefield ........................ 395/183.14 |
| 5,781,720 | | 7/1998 | Parker et al. ................... 395/183.14 |
| 5,790,778 | * | 8/1998 | Bush et al. ..................... 395/183.14 |
| 5,805,795 | * | 9/1998 | Whitton ........................... 395/183.14 |
| 5,857,071 | * | 1/1999 | Haley et al. .................... 395/183.14 |
| 6,002,869 | * | 12/1999 | Hinckley ............................... 395/704 |

OTHER PUBLICATIONS

Oshana, R., "Software Testing with Statistical Usage Based Models," Embedded Systems Programming, Jan. 1997. (8 pages).

* cited by examiner

*Primary Examiner*—Norman M. Wright
(74) *Attorney, Agent, or Firm*—Gates & Cooper

(57) ABSTRACT

A test generator creates a cyclic directed graph representation of the interface of a program being tested and then generates tests from this representation. In generating the tests, the test generator iteratively selects traversal paths through the cyclic directed graph that result in traversal of every edge in the graph in a random order with a minimum number of iterations. The resulting tests contain randomly selected actions and randomly generated data, and thus when executed, these tests randomly manipulate the program being tested.

27 Claims, 4 Drawing Sheets

COMPLETE, RANDOMLY ORDERED TRAVERSAL OF CYCLIC DIRECTED GRAPHS

CROSS-REFERENCE TO RELATED APPLICATIONS

This application is related to the following co-pending and commonly-assigned patent applications:

application Ser. No. 09/114,981, entitled "NETWORK DISTRIBUTED AUTOMATED TESTING SYSTEM," filed on same date herewith, by John T. Mongan, Dorothy M. Cribbs, and John R. DeAguiar, attorney's docket number 30566.35US01; and application Ser. No. 09/115,168, entitled "AUTOMATED TEST GENERATOR," filed on same date herewith, by John T. Mongan, attorney's docket number 30566.34US01;

both of which applications are incorporated by reference herein.

BACKGROUND OF THE INVENTION

1. Field of the Invention

The present invention generally relates to a system for testing computer programs, and, in particular, to an automated test generator.

2. Description of the Related Art

All software must be tested before it is used. Software quality assurance (QA) is distinct from conventional QA in that efficient, effective and inexpensive methods of testing software are generally not obvious. Recent catastrophic failures in long-distance telephone, airplane control and rocket guidance programs, as well as the poor reliability of many commercially available applications, bear witness that this is an art that is not nearly perfected.

Most currently accepted software testing strategies are centered on the concept of the test design. A test design is a comprehensive compilation of all the tests that will be performed on the program. The test design generally includes the actions to be performed in each test and the expected (passing) results. It may be executed by a human operator, custom programmed in a standard programming language, or, more commonly, automated using a testing tool such as Segue's QA Partner/QualityWorks™ or Microsoft's Visual Test™. In theory, the components of a test design cover every possible way in which the program could ever be used. Thus, when every test in the test design passes, the program is known to be completely free of defects.

In practice, this is never the case. No matter how carefully the test design is written, it will always have errors and omissions. Moreover, even if the authors of a test design were perfect, the idea that the test design can be truly comprehensive is flawed. Many defects are due to the interaction of different components of the program, and therefore a particular action may behave defectively only when it is preceded by a particular series of other actions. When one considers that there may be hundreds to thousands of possible actions in a moderately complex program, that a user may initiate hundreds to tens of thousands of actions in a typical session, and that the number of tests needed to "comprehensively" cover all these scenarios is the former number raised to the power of the latter, it is apparent that truly comprehensive test designs are not feasible. Thus, most test designs attempt to cover all possible actions individually and occasionally to cover some of the most obvious combinations of features. The success with which this coverage is achieved is largely dependent on the skill and experience of the authors of the test design.

Well-written test designs are generally fairly effective at revealing functional defects, such as defects where a component of the program does not work properly, but the program as a whole continues to function. However, fatal defects or "crashes", i.e., defects where the entire program ceases to function, are often missed by test designs. This may be because such defects tend to be revealed either by the user initiating an unexpected action or by the interplay of a large number of actions, both of which are situations that tend not to be covered by test designs.

Among the strategies used to supplement test design based testing are data-driven and ad hoc testing. Data-driven testing attempts to address the practical limits on comprehensiveness of test designs by separating actions (e.g., a command to draw a circle) from the data passed with them (e.g., the location and size of the circle). The test can then be repeatedly re-executed, each time using a different data set, which may be randomly generated or drawn from a large collection of stored data sets. This approach may be extremely effective for largely non-interactive data-processing programs. However, since the data driven approach applies the same actions in every execution, when applied to the interactive graphical user interface (GUI) based programs that comprise most of the commercial software market, little is gained over the traditional test design approach.

Although it may be disparaged in testing manuals, most testers do some amount of ad hoc testing. Ad hoc testing refers to a human operator testing the program without a specific written plan. In practice, a significant percentage of defects may be discovered by ad hoc testing. Nevertheless, there are serious problems with ad hoc testing. Its success is highly dependent on the skill of the tester. Since, by nature, it is conducted without a specific plan, it is almost impossible to quantify or ensure the uniformity of coverage achieved by a test design. Further, since ad hoc testing cannot be automated using the current state of the art, it is expensive: one hour of testing costs one hour of human operator time.

Thus, there is a need in the art for new techniques that increase testing efficiency by solving these problems. More specifically, there is a need in the art for techniques that are more effective at detecting fatal defects than traditional test designs and data-driven testing, yet are more quantifiable and less expensive than ad hoc testing.

The present invention solves these problems by providing a mechanism wherein the user interface of a program can be completely described as a graph or network of choices in a programmatically readable form. The testing program presented here is able to generate tests consisting of both random data and random series of actions by randomly traversing this graph of choices. Traditionally, one of the most difficult parts of automated testing is verification: determining whether the test has passed or failed. Complete verification of proper function may be particularly difficult in cases where tests are randomly generated, such as the present invention, since predicting the proper behavior of the application program may require duplication of a substantial portion of the application program's logic. However, fatal or illegal state defects such as application crashes, memory leaks or inconsistency in internal data structures are easily detected through means such as operating system error messages or assert messages. Since detection of illegal application states is independent of the path by which the application reached the illegal state, verifying that the application has not entered an illegal state is a trivial task even for randomly generated tests. The present invention is focused on discovering fatal defects, so detection of illegal states is generally sufficient verification. Comprehensively describing the interface of even a relatively complex program is a feasible task, so coverage of combinations of actions that is superior to that of a test design is achieved and many fatal defects that would be missed by a test design can be discovered. Further, since the frequency with which any option of any choice is selected can be manipulated using a Monte Carlo statistical technique, testing using this technique is more easily quantified and directed than ad hoc testing. This technique also lends itself to a high degree of automation, making it less expensive than ad hoc testing.

SUMMARY OF THE INVENTION

To address the requirements described above, the present invention discloses a method, apparatus, and article of manufacture for performing a complete, randomly ordered traversal of a cyclic directed graph. A cyclic directed graph representation is created in the computer, which then iteratively selects traversal paths through the cyclic directed graph that result in traversal of every edge in the graph in a random order with a minimum number of iterations. In one embodiment, the cyclic directed graph represents the interface of a program being tested and tests are generated from this representation. In generating the tests, a test generator iteratively selects traversal paths through the cyclic directed graph that result in traversal of every edge in the graph in a random order with a minimum number of iterations. The resulting tests contain randomly selected actions and randomly generated data, and thus when executed, these tests randomly manipulate the program being tested.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The present invention comprises a test generator that creates tests in which both the actions performed on an application program being tested and the data employed in these actions are randomly generated. This is accomplished by abstracting the user interface of the application program as a graph, where the nodes of the graph represent user interface states and the edges represent the actions and/or data that must be transmitted to the application program to drive the user interface from one state to the next. The structure of this graph, the information it represents, and statistical weighting information for the edges are defined in description files written in a standardized language. The test generator uses discrete Monte Carlo and probabilistic techniques to randomly traverse the user interface graph represented in the description files and transmits the information represented by each traversed edge to the application program. Thus, tests that randomly manipulate a user interface of arbitrary complexity are created.

Hardware Environment

Figure 1:
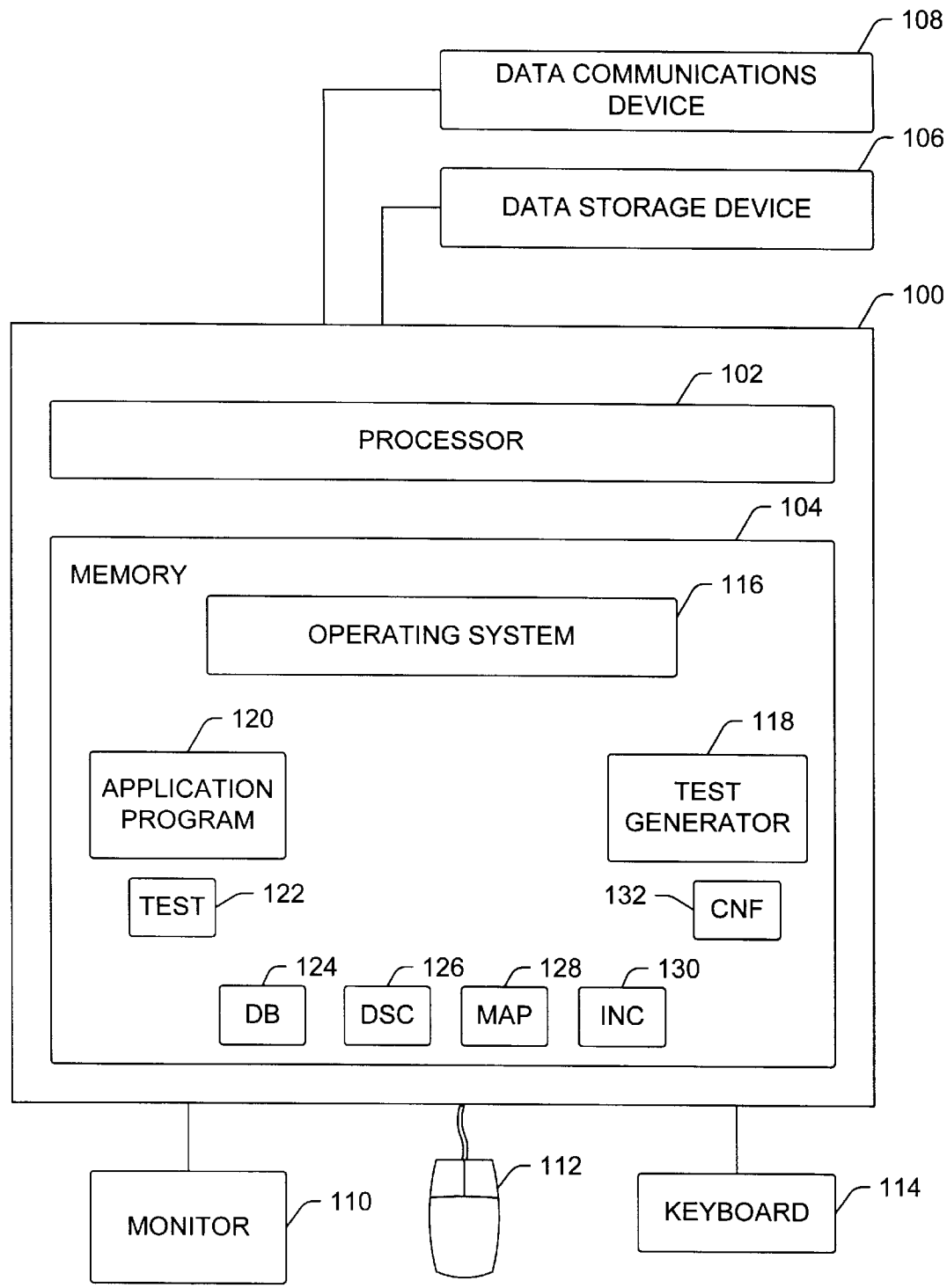
FIG. 1 is an exemplary hardware environment used to implement the preferred embodiment of the invention.

FIG. 1 is an exemplary hardware environment used to implement the preferred embodiment of the invention. The present invention is typically implemented using a personal computer 100, which generally includes, inter alia, a processor 102, random access memory (RAM) 104, data storage devices 106 (e.g., hard, floppy, and/or CD-ROM disk drives, etc.), data communications devices 108 (e.g., modems, network interfaces, etc.), monitor 110 (e.g., CRT, LCD display, etc.), mouse pointing device 112 and keyboard 114. It is envisioned that the personal computer 100 may include other devices such as read only memory (ROM), a video card, bus interface, printers, etc. These components of the personal computer 100 are usually controlled by an operating system 116. Of course, those skilled in the art will recognize that any combination of the above components, or any number of different components, peripherals, and other devices, may be used with the computer 100.

The present invention is usually implemented in a test generator 118 that is executed by the computer 100. In the preferred embodiment, the automated test generator program 118 is used to exercise functions of an application program 120 for QA purposes. The test generator 118 creates one or more randomly generated tests 122, which may be performed or executed directly by the computer 100, or which may be used in an automated testing system such as, for example, the system described in co-pending and commonly-assigned application Ser. No. 09/114,981, entitled "NETWORK DISTRIBUTED AUTOMATED TESTING SYSTEM," filed on same date herewith, by John T. Mongan, Dorothy M. Cribbs, and John R. DeAguiar, attorney's docket number 30566.35US01, which application is incorporated by reference herein. To generate the tests 122, the test generator 118 uses a number of different files including one or more database (DB) files 124 (which are generated dynamically in memory by the test generator 118 and may never be written to data storage device 106), one or more description (DSC) files 126, one or more map (MAP) files 128, one or more include (INC) files 130, and one or more configuration (CNF) files 132.

The test generator 118 and its files 122, 124, 126, 128, 130, and 132 comprise instructions and/or data which, when read, interpreted and/or executed by the computer 100, cause the computer 100 to perform the steps or elements of the present invention. The instructions and/or data are usually embodied in or readable from a computer-readable device, medium, or carrier, e.g., a local or remote data storage device 106 or a remote device coupled to the computer 100 via the data communications device 120.

Thus, the present invention may be implemented as a method, apparatus, or article of manufacture using standard programming and/or engineering techniques to produce software, firmware, hardware, or any combination thereof. The term "article of manufacture" (or alternatively, "computer program carrier or product") as used herein is intended to encompass one or more computer programs accessible from any device, carrier, or media.

Of course, those skilled in the art will recognize that the exemplary environment illustrated in FIG. 1 is not intended to limit the present invention.

Indeed, those skilled in the art will recognize that other alternative hardware environments may be used without departing from the scope of the present invention.

Implementation of the Test Generator

There are many possible ways of implementing the present invention. The embodiment described herein comprises a test generator 118, wherein the tests 122 comprise scripts that can be executed by a third party testing tool, such as Segue's QA Partner/Quality Works™, wherein the test generator 118 first generates the tests 122, then loads the tests 122 into the testing tool that can detect fatal defects and execute tests 122. Those skilled in the art, however, will recognize that any type of test 122, including one in which test 122 execution is concurrent with generation, could be generated without departing from the scope of the present invention.

Since the tests 122 generated by the test generator 118 are scripts with all actions and data hard-coded and are executed by a third party testing tool, the generator 118 need not contain any additional mechanisms for recording the sequence of actions and data selected by the test generator 118, communication between the test 122 and the application program 120, detection of application program 120 crashes or restoration of the application program 120 to a known base state. This keeps the test generator 118 compact and fast, and allows existing QA tools to be used to their maximum advantage. Furthermore, since using the test generator 118 differs from conventional automated testing only in the creation of tests 122, the same QA tools and techniques used in conventional script-based testing can be used to track down bugs.

For maximum flexibility, all application-specific information is stored in the configuration and description files 124, 126, 128, 130, and 132 that are external to the test generator 118. Since the test generator 118 contains no application-specific information, it can be adapted to test different application programs 120 merely by creating new files or modifying existing files, and no code changes to the test generator 118 are necessary.

Since there is nothing to be changed or configured in the test generator 118, there is no need for the operator to learn anything about the internal implementation of the test generator 118. The operator need only know the simple description language used by the test generator 118.

Description files 126 are the heart of the test generator 118, in that everything the test generator 118 knows about the interface of an application program 120 is in the description files 126. Description files 126 include one or more feature descriptions that comprise a block of one or more programming statements designed to exercise one or more functions of the application program 120.

As discussed above, the user interface graph, the statistical weights for the graph, and the information represented by the graph must be rendered in a machine-readable form. In the preferred embodiment, this is achieved using an application-independent description language.

The description language used to program the description files 126 is comprised of a number of different statements, which are described below, although more or fewer statements, or statements with different names and/or syntax but similar functions, could be used without departing from the scope of the present invention. In a script-generating embodiment of the present invention, the description files 126 include these statements, as well as statements and statement fragments written in the underlying scripting language.

In the description language detailed here, all statements must be contained in a DESCRIBE statement, which delimits a portion of the user interface graph and is in many ways analogous to a subroutine in conventional programming languages.

The structure of the graph is encoded in OPTION statements, which delimit edges that return directly to the same node, and EXCLUSIVE statements, which delimit edges that transit to a different node. For example, if a standard character formatting dialog box were being described, actions corresponding to clicking the bold or underline checkboxes would be encoded in an OPTION statement, since these actions leave the application 118 in the same interface state (the dialog box), while actions corresponding to clicking the OK or Cancel buttons would be encoded in an EXCLUSIVE block since these actions move the application 118 into a different interface state (such as the main window).

Information related to a single edge is delimited by a CODE statement. RAND and RANDSTRING statements provide random numeric and character data generation, respectively.

RECORD, EXTRACT, STORE and RECALL statements allow data generation based on prior actions taken by the test 122. This can be useful in testing things like editing operations, where the needed data may be something that cannot effectively be randomly generated, like the location of an existing entity.

Beyond these essential statements, a number of others are provided that may be useful in fully describing the user interface of the application program 120. Any statement not recognized as part of the description language is assumed to be a statement in the underlying scripting language, and is written directly to the test 122.

Description File Reference

Most statements in a description file 126 comprise a keyword followed by one or more parameters and one or more statements in braces. The keyword, parameters and following series of statements are referred to as a block.

The keywords used in the preferred embodiment are provided below, along with a description of the associated function. Note that optional parameters are in square brackets (i.e., [optiona]) and required parameters are in angle brackets (i.e., <required >).

// [Comment]

Comments must be preceded by a double forward slash. Everything from the slashes to the next new line is ignored. Comments are parsed out before statements are processed, so they are not inserted into the test scripts 122 generated by the test generator 118.

\} and \{

The test generator 118 interprets braces as the beginning and end of blocks. To print a brace to an output test 122, they can be "escaped" with a single backward slash.

CALL <Feature>{[{<Statements>}][{<Statements>] . . . }

CALL can be used to explicitly invoke one feature from within another. When the test generator 118 encounters a CALL, it stops processing the current feature description and looks for the specified feature description. The test generator 118 completely processes the CALLed feature and then resumes processing the feature that executed the CALL.

Optional arguments can be passed to the CALLed description. Each group of statements is evaluated and their output is passed to the CALLed description. See the CODE keyword below for information on how statements are evaluated. See the DESCRIBE keyword below for information on how CALLed descriptions access these values.

CODE {[Statements]}

The CODE block is the fundamental statement used by the test generator 118. CODE blocks are used implicitly inside every DESCRIBE block and explicitly inside EXCLUSIVE and OPTION blocks (which are described in more detailed below). Any statement except for DESCRIBE may be used inside a CODE block. Any line not recognized as a statement is treated as script code and printed to the test 122.

DESCRIBE <Feature>[[$<Pattern1>$]$<Pattern2>$ . . . ]{[Statements]}

The DESCRIBE keyword introduces a feature description and must appear outside all other blocks. The statements within the block should contain all the programming statements necessary for the test generator 118 to perform the feature. Syntactically, a DESCRIBE block functions as an implied CODE block. In other words, any construct legal in a CODE block is legal in a DESCRIBE block.

If a feature description is CALLed by another feature description, it may have arguments passed to it. The CALLed feature description can access these values by defining a replacement pattern for each argument after the feature name, and then using these patterns in the body of the DESCRIBE block where the value is needed.

All replacement patterns begin and end with a dollar sign. Just before the block is evaluated, all occurrences of defined replacement patterns will be replaced with the value of the corresponding argument from the CALL statement that called this feature description.

Replacement patterns can be used in test code or as arguments to statements, but cannot be used where a keyword is expected. All arguments in CALL statements are always optional, so if CALL is used with fewer arguments than there are replacement patterns defined in the corresponding DESCRIBE block, the undefined patterns are replaced with the null string (i.e. deleted).

EXCLUSIVE [Frequency, Frequency . . . ][REPEAT <#>]{<CODE [,CODE, CODE . . . ]>}

EXCLUSIVE blocks indicate that the CODE blocks they contain are mutually exclusive choices.

EXCLUSIVE takes a comma and/or space separated list of frequencies as an optional argument. Each frequency is a number indicating the relative frequency with which its corresponding CODE block should be evaluated. CODE blocks for which frequencies are not specified are assigned a default frequency of 10.

Exactly one CODE block in an EXCLUSIVE block is processed each time the EXCLUSIVE block is evaluated. Only CODE blocks are allowed in an EXCLUSIVE; and all other statements are ignored.

EXCLUSIVE blocks are used when there are alternate ways to accomplish the same or nearly the same objective.

EXTRACT [Frequency, Frequency . . . ]{<Index [, Index . . . ]>}

EXTRACT searches the RECORD/EXTRACT database 124 for entries created by the RECORD statement (which is described below). When more than one Index is specified, an optional list of relative frequencies can be given for the test generator 118 to use in selecting an Index. The test generator 118 then searches the RECORD/EXTRACT database 124 using the selected Index. If it finds one entry, it returns that entry; if it finds multiple entries for the selected Index, it randomly returns one of them.

The RECORD/EXTRACT database 124 is organized in hierarchical categories. Anything proceeding a period is treated as a category; and the final part of the Index is the key. For example, with the Index "animals.dog", EXTRACT would select an entry under the "dog" key in the "animals" category. A * character can be used in place of an explicit key to have the test generator 118 randomly select a key from the given category. The index "animals.*" would use a randomly selected key from the "animals" category. Any Index that ends with a period implicitly uses the * key. For example, "animals." is identical to "animals.*" If no values have been recorded to the Index used for extraction, EXTRACT will return the most specific default given in the configuration file for the category or sub-category searched.

LAST {<Index>}

LAST accesses a history of values selected by the test generator 118. Values returned by RAND and EXTRACT are included in this history. Index is an integer indicating how far back in the history LAST should look, e.g., LAST{1} returns the value returned by the most recent RAND or EXTRACT block. Values returned by LAST are not included in the history. The history is reset at the beginning of each test 122.

OPTION [Probability, Probability . . . ][REPEAT<#>] {<CODE [,CODE . . . ]>}

OPTION blocks are used when a series of CODE blocks are independent of each other. Each component CODE block may or may not be executed.

OPTION takes a comma and/or space separated list of probabilities as an optional argument. Each probability is a number between 0 and 1 indicating the likelihood that the corresponding CODE block will be evaluated (a 0 probability will never be evaluated, a 1 will always be evaluated).

If the list of probabilities is omitted, or there are more CODE blocks than probabilities, CODE blocks without an explicit probability are assigned a default probability of 0.5. If the REPEAT keyword is used, the OPTION block will be evaluated a random number of times between 1 and the number following REPEAT.

The order of the CODE blocks within an OPTION block is unimportant. For better testing of errors dependent on the order of actions, the test generator 118 shuffles the order of the CODE blocks each time the OPTION block is evaluated. If the OPTION block has a REPEAT, the test generator 118 re-shuffles before each REPEAT.

Some features may have a number of actions, or groups of actions that must all be completed to successfully execute the feature, but need not occur in any particular order. In cases like this, the shuffling feature can be used to advantage by making each of these actions a CODE block within an OPTION block and setting all the probabilities to 1. This ensures that each action is always performed, but allows the test generator 118 to randomly select the order.

RAND {<Limit >[,Limit]}

The RAND block writes a random number to the test 122. Limits are numbers, and at least one must be specified. If one limit is given the block evaluates to a random number between 0 and the limit. If two limits are specified, they are taken as a range, and the block evaluates to a random number between those limits, inclusive of the lower limit and exclusive of the upper limit.

RANDSTRING {<Limit>}
RANDSTRING evaluates to a string of randomly chosen length between 1 and Limit. The first character of the string is a letter. Subsequent characters may be letters, numbers or underscores.

RECALL {<Index [,Index . . .]>}
RECALL is like EXTRACT except that it reads the STORE/RECALL database 124 produced by the STORE keyword (described below) and it returns the entries associated with all of the Indices provided rather than just selecting one.

To read out everything saved by STORE, the RECALL{*} statement is used. This is the most common way to use RECALL.

Values returned by RECALL are not included in the history accessed through LAST.

RECORD <Index>{[Statements]}
All the statements in a RECORD block are entered in the RECORD/EXTRACT database 124 under the specified Index, which can be any string, and passed through to the output file. The Index can be used later to EXTRACT recorded data.

RECORD does not over-write anything in the RECORD/EXTRACT database 124. If the same Index is used multiple times, all entries are retained. If a given Index has more than one entry, using EXTRACT on that entry returns one randomly selected entry.

RECORD can be used to save any kind of data, but it is most frequently used to maintain a RECORD/EXTRACT database 124 of points on entities so they can be located by features performing editing functions.

The RECORD/EXTRACT database 124 is organized in hierarchical categories. Anything preceding a period is treated as a category; and the final part of the Index is the key. For example, with the Index "animals.dog", RECORD makes an entry under the "dog" key in the "animals" category.

Each category has a separate name space and subcategories can be nested as deeply as desired. However, the RECORD statement should not be used directly to a category, nor should a key be used as a category.

For example, after using "animals.dog" as an Index in a RECORD, an error results if just "animals" or "animals.dog.tail" are used as a RECORD Index. Using hierarchical indices allows for flexible assignment of default values and extraction.

If Index is omitted, RECORD does nothing and processing of the feature continues. Nested RECORDs are implemented, but should be unnecessary. In addition, a * character should not be as the key in a RECORD block, because the * character is a special key used by EXTRACT to indicate "everything", and thus any entries made under the * character will not be directly accessible.

STORE <Index>{[Statements]}
All the statements in a STORE block are saved in the STORE/RECALL database 124 for later recovery by RECALL. In principle, STORE is similar to RECORD. Unlike RECORD, only one entry is maintained per Index. If STORE is used with an Index that already has an entry, newer statements will over-write the older entry. STORE also differs from RECORD in that it "swallows" its statements instead of passing them through to the output test 122. STORE uses a different data structure than RECORD, so there is no conflict between entries created with RECORD and entries created with STORE, even if they use the same Index. The STORE/RECALL database 124 used by STORE is cleared at the beginning of each action in the test 122.

UNIQUESTR {<Index>}
UNIQUESTR evaluates to a string that is unique within a test 122, based on the Index that is used. If two instances of UNIQUESTR use the same Index and are in the same feature description, they will produce the same string. In all other cases, two instances of UNIQUESTR will never produce the same string in a single test 122. UNIQUESTR is safe in potentially recursive feature descriptions: a particular use of UNIQUESTR will produce different strings at different recursion levels. Potential uses of UNIQUESTR include variable names and goto labels.

Locating Description Files
The test generator 118 uses three methods to locate feature descriptions. The map file 128, described below, is the primary method for locating feature descriptions. The test generator 118 can also locate any feature descriptions that are in the same file as a feature description listed in the map file 128, and any feature descriptions that are located in the directory specified by $CommonDir in a configuration file 132.

Map File
The map file 128 is named map.rno. It is a line-oriented, plain text file. Each line contains the name of a feature, the relative frequency with which that feature should be evaluated, and the path and filename to the feature's description file 126, in that order:

//Sample map file

| Circle | 5 | circle.dsc |
| Pline | 3 | pline.dsc |

The feature name must exactly match the feature name in the DESCRIBE block of the description file 126.

The relative frequency is a number indicating how often the feature should be selected for evaluation. The higher the number, the more often the feature will be selected. The probability that a given feature will be selected in a single selection equals the feature's relative frequency divided by the sum of the relative frequencies of all the features. Frequencies of 0 are allowed; a zero frequency description will never be used unless it is directly CALLed by another (non-zero frequency) description.

Paths are relative to the location of the map file 128. If the description file 126 is in the same directory as the map file 128, the path is optional.

Blank lines and comment lines are allowed. Comment lines must begin with a double forward slash.

Common Directory and Description File Scanning
The map file 128 is the only way to indicate the existence of feature descriptions with non-zero frequencies, but there are two other ways for the test generator 118 to locate zero frequency feature descriptions. Zero frequency feature descriptions can be used like subroutines to facilitate code reuse and allow a modular structure for large feature descriptions.

Every description file 126 that is listed in the map file 128 is scanned for other feature descriptions that may not have been explicitly listed in the map file 128. This means that a feature description can CALL any other feature description that is in the same file, regardless of whether the CALLed feature description is listed in the map file 128. This is useful for subroutine-like feature descriptions.

Every file and subdirectory in the directory specified by the $CommonDir item of the configuration file 132 is automatically scanned for feature descriptions. Any feature description in this tree can be CALLed regardless of whether or not it is listed in the map file 128. This is helpful for developing libraries of shared feature descriptions.

Include Files

It may be necessary to declare variables or subroutines in the underlying scripting language to assist feature descriptions. Since a feature description may be called more than once in a given test 122, it can be difficult or impossible to properly declare these from inside the description file 126.

The solution is to use include files 130. Whenever the test generator 118 uses a description file 126, it looks for an include file 130 with the same base name but an extension specified by $IncludeFileExtension. It then concatenates these files 126 and 130 to form a single file, named in $IncludeFilename, which can be included by the generated test 122. This is usually done automatically with a line in the $FilePre section of the configuration file 132, which is described in more detail below.

Note that include files 130 are concatenated by the test generator 118, but not processed, so keywords cannot be used in them. The test generator 118 functionality is available only in description files 126.

Also, beware of using any random functions the underlying scripting language may provide. Such functions may return different values each time a test 122 is run, making it difficult to reproduce failures. All randomness should come from the test generator 118, which produces different values each time a test 122 is generated, but hard-codes these values into the generated test 122 so they are the same for each run.

Description File Examples

The following provides an example of how description files 126 are created for the test generator 118. This example illustrates the creation of a simple description of the portions of the circle command in Autodesk's AutoCAD™ using the 4Test™ language employed by Segue's QA Partner™ as the underlying scripting language.

As described above, the first step is to add a line to the map file 128, so that the test generator 118 can find the new feature description. The line added might look like the following:

| Circle | 10 | circle.dsc |
|--------|-----|------------|

The next step is to create the description file 126 using a text editor (description files 126 are plain-text files). The filename for the description file 126 must match the one entered in the map file 128, which in this example is "circle.dsc" as indicated above.

At minimum, the description file 126 has to contain the following lines:

DESCRIBE Circle
{
}

The DESCRIBE keyword indicates the beginning of the feature description. Following the DESCRIBE is the feature name, which must match the name specified in the map file 128. Finally, a set of braces contains the actual programming statements associated with the feature.

Although the example description file 126 provided above is properly constructed, it is not particularly useful, since there is nothing specified within the braces. The following DESCRIBE block actually enables the circle feature to draw a circle:

DESCRIBE Circle
{
    ACAD_TypeE("_circle 5,5 3");
}

The line added above is a 4Test™ programming statement that invokes a 4Test™ function that causes QA Partner™ to transmit the argument to an AutoCAD™ application program 120 as keystrokes. As the above example shows, underlying script code is placed directly into the feature description. Any line without a keyword is assumed to be underlying script code and is printed directly to the test 122.

While the above DESCRIBE block draws a circle every time it is evaluated, there is plenty of room for improvement. For example, the RAND keyword can be used to randomly select different radii every time a circle is drawn:

DESCRIBE Circle
{
    ACAD_TypeE("_circle 5,5 RAND{4}");
}

In the above example, each circle drawn will have a different radius between 0 and 4. To set a minimum radius of 1, the RAND{1,4} statement can be used, which limits the random numbers produced to the range of 1 to 4.

The drawn circles could also have a randomly selected center point. This can be performed using RAND and a previously-defined POINT feature description:

DESCRIBE Circle
{
    ACAD_TypeE("_circle CALL Point{} RAND{4}");
}

The test generator 118 can "remember" where these random circles were drawn, so that they can be found again for use with edit commands. The Point feature description is designed to do just that when an argument is used with the CALL.

The argument is an index to store the point generated. The Point feature description uses RECORD to make an entry in the RECORD/EXTRACT database 124. The RECORD/EXTRACT database 124 used by record uses a hierarchy of categories so different kinds of data can be stored. Use of these categories makes it easier to retrieve the type of the desired data. Since a point on a circle is stored, RECORD stores it into the Pts (points) category. This can be done by using Pts.Circle as an index. A simple Circle feature description to store circles in the RECORD/EXTRACT database 124 is provided below:

DESCRIBE Circle
{
    ACAD_TypeE("_circle CALL Point{} CALL Point{{Pts.Circle}}");
}

The CALL can be used to evaluate any feature description, but it is best to limit it to a few subroutine-like functions and let the test generator 118 decide when to call the true features. The above feature description draws randomly sized circles at random locations, but there are a number of different ways a circle can be drawn. It is probably best to test all these different methods.

EXCLUSIVE Blocks

A separate feature description could be created for each method of drawing a circle. This would be messy, however, and result in much code duplication. A better option is to keep a single circle description and add an EXCLUSIVE block, so that the test generator 118 can choose the method it will use to draw the circle. EXCLUSIVE stands for mutually exclusive, meaning that only one block of code in the EXCLUSIVE block will be evaluated. This makes sense, in this case, because only one method of drawing a circle can be used for each circle drawn.

CODE blocks are used to indicate the different choices that can be made by an EXCLUSIVE block. CODE blocks are the only type of keyword allowed immediately within an EXCLUSIVE block. The inside of a CODE block is like the inside of a DESCRIBE block, in that any keyword can be used.

Following is a circle description using EXCLUSIVE to allow the test generator 118 to pick the way to draw the circle:

```
DESCRIBE Circle {
ACAD_TypeE("_circle");
EXCLUSIVE 5,2,1 REPEAST 1 {
        CODE {
                CALL Point { }
                CALL Point { Pts.Circle }
        }
        CODE {
                ACAD_TypeE("_2P");
                CALL Point { Pts.Circle }
                CALL Point { }
        }
        CODE {
                ACAD_TypeE("_3P");
                CALL Point { Pts.Circl }
                CALL Point { }
                CALL Point ∴ }
        }
}
}
```

Note the list of numbers after the EXCLUSIVE keyword. These are the relative frequencies that the test generator 118 will use to choose the code block it evaluates. The order of the frequencies corresponds to the order of the CODE blocks within the EXCLUSIVE. The list of frequencies is optional; if it is omitted, all CODE blocks are evaluated with equal frequency.

Immediately following the list of frequencies is the optional REPEAT part of an EXCLUSIVE block. If the REPEAT keyword is included, the number following it indicates the maximum number of times the EXCLUSIVE block should be evaluated in succession. The test generator 118 picks a random number between 1 and this maximum, and evaluates the EXCLUSIVE block that many times in succession before proceeding. If REPEAT is omitted, the test generator 118 evaluates the EXCLUSIVE block once, which is the same behavior as that achieved with the REPEAT 1 statement used above.

OPTION Blocks

In some cases, a feature allows a number of choices that are independent of each other. Consider the choices presented in a text formatting dialog. It does not make sense to put code for setting the bold, italic and underline attributes in an EXCLUSIVE block, because the EXCLUSIVE block will choose exactly one of the CODE blocks. In this case, it would probably be preferable that the test generator 118 evaluate as many as all, or as few as none of these blocks. For situations like this, the test generator 118 provides the OPTION block.

The syntax of an OPTION block is almost identical to the syntax of an EXCLUSIVE block. The only difference is that, since each of the OPTION block's CODE blocks are independent of each other, the list following the OPTION keyword is a list of probabilities, not a list of relative frequencies. Each element of the list of probabilities indicates the likelihood that its corresponding code block will be evaluated. A CODE block with a probability of 0 will never be evaluated; one with a probability of 1 will always be evaluated. If the list of probabilities is omitted, each block is assigned a probability of 0.5 (fifty-fifty chance).

In an OPTION block, each probability is completely independent of the other probabilities. Changing one probability affects only that probability's corresponding CODE block, and has no affect on any other CODE block within the OPTION block.

In the description below, an OPTION block is used to determine whether or not the second point will define the diameter of the circle. In this particular case, an EXCLUSIVE block could be used with equal success, but in many other cases, OPTION blocks are necessary.

Although the example below includes only one CODE block, OPTION blocks, like EXCLUSIVE blocks, can contain as many CODE blocks as desired. In fact, if an OPTION block contains multiple CODE blocks, the order of the CODE blocks is shuffled before evaluation for better coverage of order-dependent bugs.

```
DESCRIBE Circle {
ACAD_TypeE("_circle");
EXCLUSIVE 5,2,1 REPEAT 1 {
        CODE {
                CALL Point { }
                OPTION .3 {
                        CODE {ACAD_TypeE("_d");}
                }
                CALL Point { Pts.Circle }
        }
        CODE {
                ACAD_TypeE("_2P");
                CALL Point { Pts.Circle }
                CALL Point { }
        }
        CODE {
                ACAD_TypeE("_3P");
                CALL Point { Pts.Circle }
                CALL Point { }
                CALL Point { }
        }
}
}
```

Configuration Files

The configuration files 132 used with the test generator 118 contain machine specific information, user specific information, and global configuration information that would be shared by everyone working on a particular project. The configuration file 132 is parsed and used to set constants that affect how the test generator 118 generates test scripts 122.

The items listed in the table below are configuration parameters that are found in the configuration file 132. These configuration parameters control the size of the test scripts 122 generated by the test generator 118 and the locations of input and output files.

| | |
|---|---|
| $TestActions | The number of feature descriptions called per test script. |
| $TestCases | The number of test scripts generated per file. |
| $TestFiles | The number of files generated. Files are named based on $TestFilePath. |

-continued

| | |
|---|---|
| $AcceptMode | When set to 1, the test generator 118 attempts to evaluate every CODE block in every feature description while generating as few test scripts as possible. Test generation is normal when set to 0. |
| $MapFileDir | Location of the map file. |
| $CommonDir | Directory tree to be scanned for sub-descriptions (Location is relative to $MapFileDir). |
| $OutputDir | Directory in which test and include files are written. |
| $StructFilename | Filename for summary of feature description graph traversal. Set to 'NUL:' (Windows) or '/dev/null' (UNIX) to suppress output |
| $IncludeFilename | Filename for include file. |
| $TestFilename | Filename for generated test scripts. |
| $ConsoleOutput Format | Specifies the text string to use when writing the status line during test generation. |

The items listed in the table below are advanced configuration parameters found in configuration file 132. These parameters control the underlying structure of the database 124, as well as the test scripts 122 it generated by the test generator 118.

Using these parameters, the test generator 118 can be adapted to different projects without changing the program 118 itself. Once the appropriate values are determined for a project, these items should need infrequent modification. Successfully changing these values requires a relatively thorough understanding of how the test generator 118 works.

| | |
|---|---|
| $GlobDefault | The default value to be returned if EXTRACT cannot find a value for the specified key. |
| %DBDefaults | A series of hierarchy-specific default values to be returned if EXTRACT cannot find the specified key. Each entry should be on a separate line, and of the format "Key" => "DefaultValue", More specific keys over-ride more general keys. |
| $IncludeFileExtension | Extension of files that should be associated with description files of same base name but different extension and used to generate $IncludeFilename |
| $FinalizerDescription | Name of feature description that should be called at the end of every test script. This feature description may be used to verify that the application is in a legal state. |
| $TestCaseName | Name pattern for test scripts. ### will be replaced with the test script's number within the file to ensure unique names. This should match the names specified for test scripts in $TestPre. |
| $FilePre | This value is written to the beginning of each file. Before being written, any occurrences of TESTCASENAMES are replaced with a list of the names of all the test scripts generated in the file. This list is based on $TestCaseName. |
| $FilePost | This value is written to the end of every file. |
| $TestPre | This value is written to the file immediately before each test script. The test generator 118 resets all of its databases at the beginning of each test script, so this should include code to reset the application to a base state. Any occurrences of ### are replaced with the number of the test script within the file, to ensure unique test script names. Make sure that the pattern used to name test scripts matches the one specified in $TestCaseName. |
| $TestPost | This value is written to the file after each test script. |
| $ActionPre | This value is written to the file before each feature generated. |
| $ActionPost | This value is written to the file after each feature generated. |

Acceptance Mode

In normal operation of the test generator 118, sections of feature descriptions with very low frequency or probability may not be evaluated very often. In the process of debugging a set of description files 126, it may be desirable to have the test generator 118 evaluate every section of every description file 126 in a short period of time. This can be done using acceptance mode.

In acceptance mode, the test generator 118 keeps track of which sections of a description file 126 it has already evaluated and will revisit these sections only when necessary to reach an unevaluated section. This behavior causes the test generator 118 to evaluate every section of every description file 126 in a relatively efficient manner.

Test 122 generation is still random and based on frequencies, so higher frequency items are likely to be evaluated before those with lower frequencies. Note that the test generator 118 considers any description file 126 or CODE block with a frequency or probability of 0 to be effectively "commented out," so even in acceptance mode these sections will not be evaluated.

Once all non-zero probability sections have been evaluated, the test generator 118 will report "All branches traversed" and test 122 generation will cease at the end of the current file 126.

The test generator 118 can be set to run in acceptance mode through the $AcceptMode switch in the configuration file 132.

Stateless Verification

In addition to detection of application program 120 crashes, it is often desirable to have a description that explicitly initiates actions that detect undesirable program 120 states, such as memory leakage or inconsistency in internal data structures. This feature description, which is specified using the $FinalizerDescription statement, is called at the end of the test 122 if it can be located. If its frequency is 0, it will be called only at the end of tests 122.

User Interface Graph Traversal

In the present invention, the description files 126 comprise a text-based representation of the user interface of the application as a directed, cyclic graph. For purposes of quickly verifying that the descriptions are correct and match the user interface of the application being tested, it is desirable to have an "acceptance mode" in which the generator creates a series of tests that make use of every part of a set of description files 126. This can be done by traversing all edges of the graph formed by the description files 126. The present invention includes a mechanism for efficiently traversing all edges of such a graph in a random order.

A graph is an abstract representation of data consisting of points (nodes) and lines (edges) connecting the nodes. As applied to the present invention, nodes represent user interface states and edges represent the data and/or actions that must be transmitted to the application to move it from one interface state to another. The term directed means that each edge may be traversed in only one direction.

The graph formed by the description files has one base node, corresponding to the designated "base state" of the application's user interface (the "base state" is often defined as the first user interface state of the application after it begins execution). The term cyclic means that any path of traversal through the graph eventually returns to the base node.

Figure 2A:
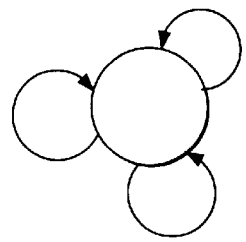
FIGS. 2A, 2B, and 2C are illustrations of graphs that are created and used by test generator according to the present invention.

In understanding the structure of the graph formed by the description files 126 of the present invention, it may be helpful to appeal to higher levels of abstraction. Since all paths that exit the base node eventually return to it, at a high level of abstraction the graph can be considered to be comprised of one node with any number of edges that both exit and enter the node. Such a graph is illustrated in FIG. 2A. In the present invention, this node is roughly correspondent to the map file 128 and these edges to descriptions.

In fact, a traversal path originating and terminating at the base node may pass through other nodes. Thus, the "edges" of the highly abstracted graph described in the above paragraph each represent a section or fragment of the actual graph with a single entry point and a single exit point. These fragments are composed of three basic structures.

Figure 2B:
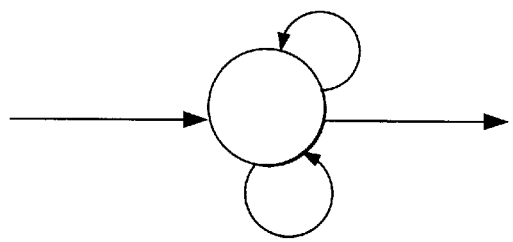
Figure 2C:
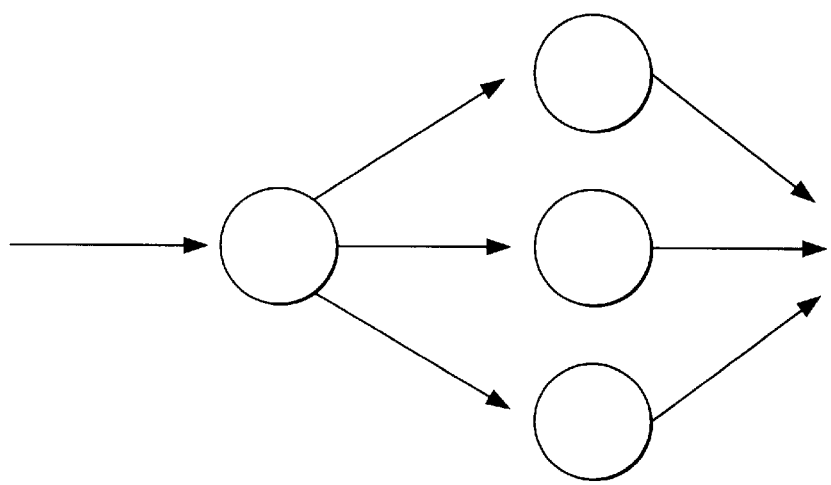

The first type of structure is comprised of an edge that enters a node from which any number of edges exit. All of these edges exiting the first node provide different paths to the same second node. FIG. 2C illustrates this type of structure, referred to hereafter as a structure of type 1. In the present invention, such a structure represents an EXCLUSIVE block.

The second type of structure is different from the first in that of the edges exiting the first node, only one node continues to a second node and all the others re-enter the first node. This structure represents an OPTION block in the present invention. FIG. 2B illustrates this type of structure, referred to hereafter as a structure of type 2.

The third type is that the edge in the abstracted graph simply represents a single edge in the actual graph.

Just as the "edges" in the highest level abstraction of the graph represent one of the three possible graph fragment structures described above, each of the "edges" in the first two structures represents a graph fragment of one of the three types described above. Thus, one can imagine a series of abstractions of the actual graph, in which each successive abstraction has more "edges" that represent edges in the actual graph (the third type of structure) and fewer "edges" that represent one of the first two types of structures. The final "abstraction" in this series would be a graph in which all "edges" represented edges in the actual graph; in other words, a copy of the actual graph. By applying this series of abstractions, every node in the actual graph must be the base node, or the central part of one of the first two types of structures. This reasoning greatly simplifies the task of complete, random traversal.

Before beginning traversal, an array of Boolean values is constructed such that there is an element representing each edge leaving the base node, each edge exiting the central node of structures of type 1 and each edge exiting and re-entering the central node of structures of type 2 in the graph. A value of true indicates the edge has been traversed. A stack that can contain references to the elements of the array is also created.

Each iteration consists of a single traversal path through the graph that begins and ends at the base node. At the beginning of each iteration, an edge is randomly selected from those that exit the base node and are marked as untraversed. The Boolean for this edge is set true and a reference to the Boolean is pushed on the stack. According to the definition of the full graph given above, all edges must enter either the base node, a graph structure of type 1 or a graph structure of type 2. When the base node is encountered, the iteration is complete; another iteration begins with an empty stack.

When a type 1 structure is encountered, the number of edges that exit the central node and are marked as untraversed is computed. If there is more than one, every edge referenced in the stack is marked false (untraversed). This ensures there will be at least one path of "untraversed" edges leading from the base node to this structure, since it will still contain at least one untraversed edge at the end of the current iteration. Next, an untraversed edge is selected at random, unless all edges are marked traversed, in which case a traversed edge is selected at random. This edge is then traversed: its Boolean is set true and a reference to it is pushed onto the stack. If the "edge" selected for traversal represents one or more fragments of type 1 or 2 rather than an edge in the actual graph, these structures are traversed according to the methods described in this and the following paragraph. Once the edge and any fragments it represents have been traversed, the reference to the edge is popped from the stack.

When a type 2 structure is encountered, each edge that exits and reenters the central node and is marked as untraversed is sequentially traversed. This done by setting the appropriate Boolean true, pushing a reference to it, performing the appropriate procedures for the type 1 or 2 structures that the "edge" may represent, and finally popping the edge reference from the stack when the selected edge has been traversed. After all edges that reenter the central node have been traversed the edge that enters a new node is traversed.

In an alternate embodiment that improves efficiency, a copy of the stack is made and the stack is cleared before beginning traversal of any edges. Sequential traversal proceeds as described above, but after each edge has been traversed the Boolean indicating the "traversal" status of the edge is examined. If the edge has been "unmarked" (the Boolean is false) due to untraversed edges within the fragments that the "edge" represents, the "edge" is traversed until it remains marked after traversal. After all edges that reenter the central node are marked as traversed (have their Booleans set true), the stack is restored from the copy and the edge that enters a new node is traversed.

At the end of an iteration, an "edge" will be marked as traversed only if all of the edges in the graph fragments that it represents have been traversed. Thus, when all edges exiting the base node are marked as traversed, the graph has been completely traversed and no further iterations are necessary.

While the present invention is described in the context of creation of software tests, those skilled in the art will recognize that the invention is not limited to such use and may be generally useful in any case where it is necessary to perform complete, randomly ordered traversal of a graph having the structure described here.

Logic of the Test Generator

Figure 3A:
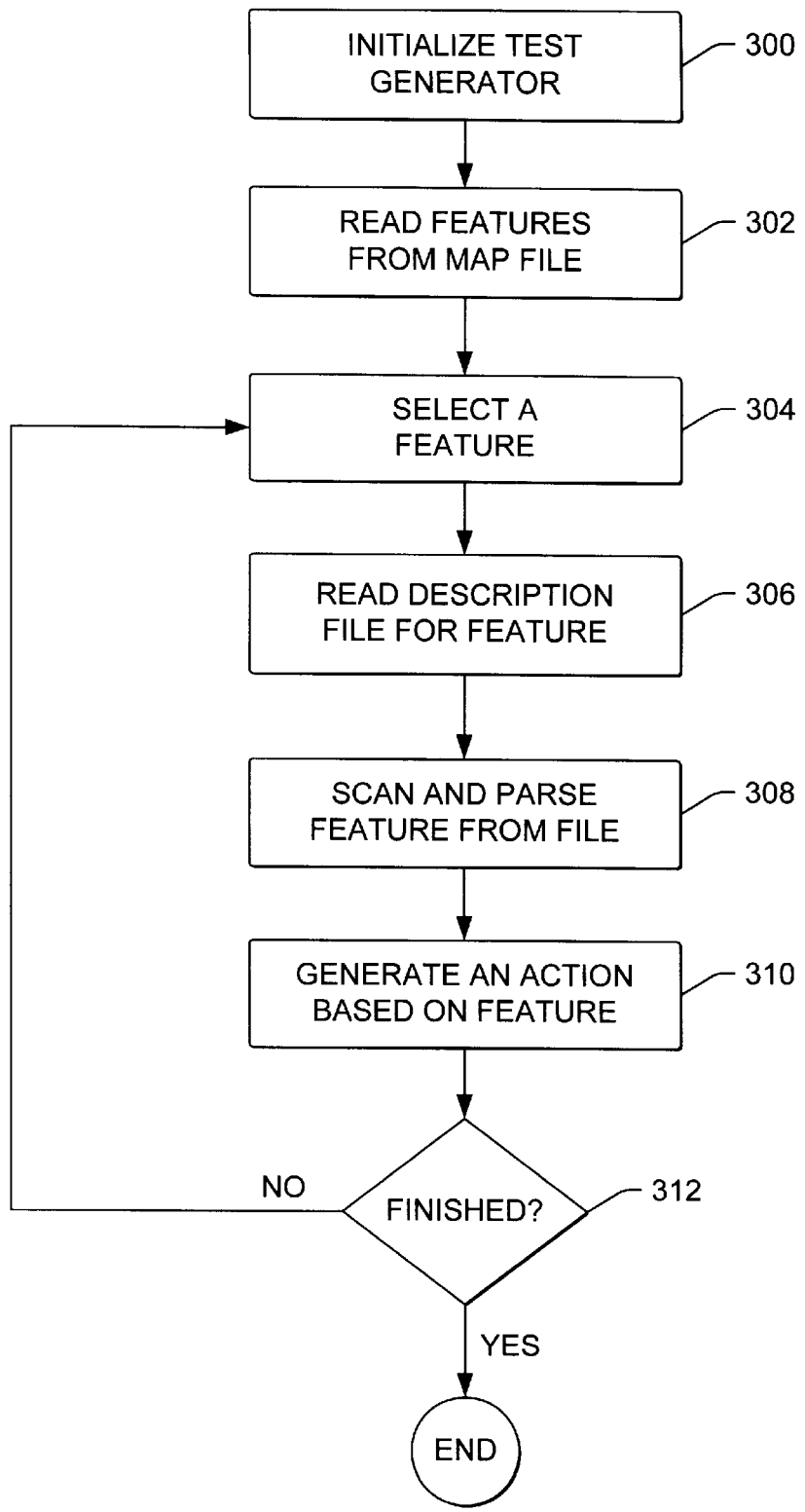
FIGS. 3A and 3B together are a flowchart that illustrates the general logic of an automated test generator performing the steps of the present invention.
Figure 3B:
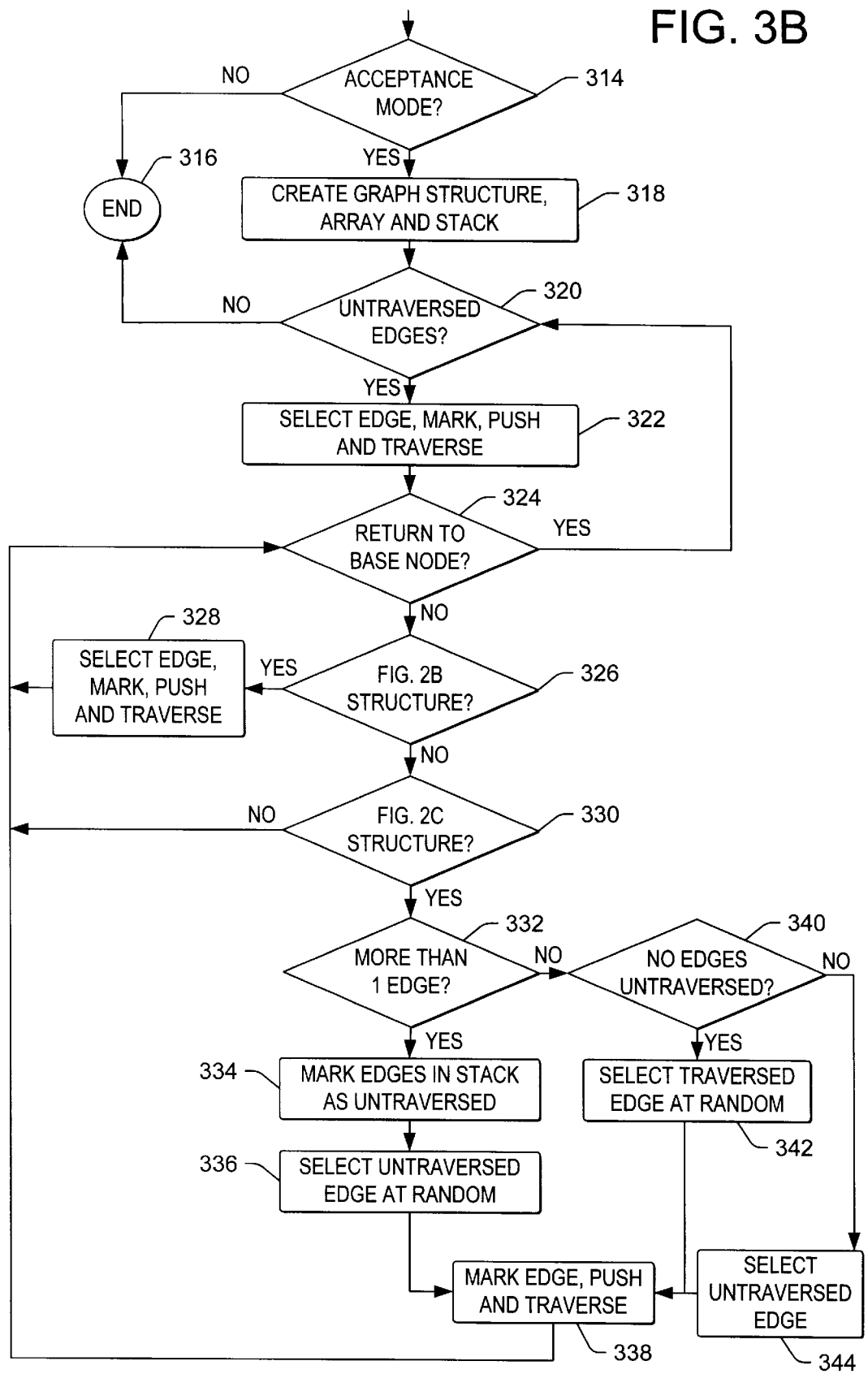

FIGS. 3A and 3B together are a flowchart that illustrates the general logic of the test generator 118 when performing the steps of the present invention.

Block 300 represents the test generator 118 initializing for execution on the computer 100.

Block 302 represents the test generator 118 reading a specified map file 128 to identify the feature descriptions cited therein. The map file 128 may be specified interactively or via runtime parameters.

Blocks 304–312 comprise a loop for processing features specified in the map file 128.

Block 304 represents the test generator 118 selecting a feature.

Block 306 represents the test generator retrieving the description files 126 for the feature. Alternatively, that the feature need not be read from the file (or scanned and parsed in the next step). A cache of recently used descriptions is maintained in a parsed form; if the needed description is in the cache, it can be loaded directly from there without parsing.

Block 308 represents the test generator 118 scanning and parsing the feature descriptions, their associated programming statements, relative frequencies, random functions, shuffling functions, etc., from the retrieved description files 126. If the selected feature CALLs a feature, then the CALLed feature must be read, parsed and generated in an iterative manner.

Block 310 representing the test generator 118 generating a test 122 action based on the feature that has been read.

Block 312 is a decision block that represents the test generator 118 determining whether a specified number of actions have been generated. If not, control transfers to Block 304; otherwise, the logic ends.

FIG. 3B describes an alternate mode of operation for the generator from FIG. 3A. The processes involved alter the operation of boxes 304 and 310 in FIG. 3A. In effect, it is a detail chart of a concurrent process, rather than a separate process, from FIG. 3A. Moreover, the method involves complex recursion (i.e., recursion from more than one location).

Block 314 is a decision block that represents the test generator 118 determining whether it is in acceptance mode. If not, control transfers to Block 316, which terminates the logic; otherwise, control transfers to Block 318.

Block 318 represents the test generator 118 creating a graph data structure in the memory 104 of the computer 100 comprised of one or more nodes connected by one or more edges, wherein the nodes represent a block of programming statements (i.e., EXCLUSIVE, OPTION, CODE blocks), and the edges represent the data. Block 318 also represents the test generator 118 constructing an array of Boolean values in the memory 104 of the computer 100, such that there is an element representing each edge leaving the base node and an element representing each interior edge for the structures of FIGS. 2B and 2C in the graph. Finally, Block 318 represents the test generator 118 creating a stack to contain references to the elements of the array.

Blocks 320–342 comprise a loop for iteratively traversing the graph data structure created by the test generator 118.

Block 320 is a decision block that represents the test generator 118 determining whether there are any untraversed edges exiting the base node in the graph data structure. If not, control transfers to Block 316, which terminates the logic; otherwise, control transfers to Block 322.

Block 322 represents the test generator 118 randomly selecting, at the beginning of each iteration, an edge from those that exit the base node and are marked as untraversed. Any edge will enter either a FIG. 2A structure (the base node), a FIG. 2B structure, or a FIG. 2C structure. Block 322 also represents the test generator 118 writing the programming statements associated with the traversed edge to the test file 122, setting the Boolean for this edge to "true" to mark the edge as traversed, pushing a reference to the Boolean onto the stack, and traversing the edge.

Block 324 is a decision block that determines whether the test generator 118 has returned to the base node, i.e., a FIG. 2A structure, which indicates that the iteration is complete. If so, control transfers to Block 320 to begin another iteration.

Block 326 is a decision block that determines whether the test generator 118 has encountered a FIG. 2B structure. If so, control transfers to Block 328, which represents the test generator 118 selecting each edge in turn, setting the Boolean for the edge to "true" to mark the edge as traversed, pushing a reference to the Boolean onto the stack, and traversing the edge. After each edge is traversed, control transfers to Block 324.

Block 330 is a decision block that determines whether the test generator 118 has encountered a FIG. 2C structure. If so, control transfers to Block 332; otherwise, control transfers to Block 318.

Block 332 is a decision block that represents the test generator 118 determining whether the number of edges exiting the central node marked as untraversed is more than one. If so, control transfers to Block 334; otherwise, control transfers to Block 340.

Block 334 represents the test generator 118 marking every edge referenced in the stack as "false" (untraversed), which ensures there will be at least one path of "untraversed" edges leading from the base node to this structure, since it will still contain at least one untraversed edge at the end of the current iteration.

Block 336 represents the test generator 118 selecting an untraversed edge at random.

Block 338 represents the test generator 118 traversing the selected edge, writing the programming statements associated with the traversed edge to the test file 122, setting its Boolean to "true" to mark the edge as traversed, pushing a reference to the Boolean onto the stack, performing the appropriate procedures for any FIGS. 2B or 2C structures encountered, and then finally popping the reference from the stack. Thereafter, control transfers to Block 324.

Block 340 is a decision block that represents the test generator 118 determining whether there are no edges marked as untraversed. If so, control transfers to Block 342; otherwise, control transfers to Block 344.

Block 342 represents the test generator 118 selecting a traversed edge at random and Block 344 represents the test generator 118 selecting the untraversed edge. Thereafter, in both instances, control transfers to Block 338, which represents the test generator 118 traversing the selected edge, setting its Boolean to "true", pushing a reference to the Boolean onto the stack, performing the appropriate procedures for any FIG. 2B structures or FIG. 2C structures that are encountered, and then finally popping the reference from the stack. Thereafter, control transfers to Block 324.

When all edges exiting the base node are marked as traversed, the graph has been completely traversed and no further iterations are necessary. At this point, control transfers to Block 316, which terminates the logic.

Conclusion

This concludes the description of the preferred embodiment of the invention. The following describes some alternative embodiments for accomplishing the present invention.

For example, any type of computer, such as a mainframe, minicomputer, workstation or personal computer, or network computer could be used with the present invention. In addition, any software program, application or operating system could benefit from the present invention.

In summary, the present invention discloses a method, apparatus, and article of manufacture for performing a complete, randomly ordered traversal of a cyclic directed graph. A cyclic directed graph representation is created in the computer, which then iteratively selects traversal paths through the cyclic directed graph that result in traversal of every edge in the graph in a random order with a minimum number of iterations. In one embodiment, the cyclic directed graph represents the interface of a program being tested and tests are generated from this representation. In generating the tests, a test generator iteratively selects traversal paths through the cyclic directed graph that result in traversal of every edge in the graph in a random order with a minimum number of iterations. The resulting tests contain randomly selected actions and randomly generated data, and thus when executed, these tests randomly manipulate the program being tested.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An apparatus for performing a complete, randomly ordered traversal of a cyclic directed graph, comprising:
    (a) a computer; and
    (b) means, executed by the computer, for creating a cyclic directed graph representation in the computer; and
    (c) means, executed by the computer, for iteratively selecting traversal paths through a cyclic directed graph that result in traversal of every edge in the graph in a random order with a minimum number of iterations.

2. The apparatus of claim 1 above, wherein one or more traversal status variables are used to track whether associated edges in the graph have been traversed.

3. The apparatus of claim 2 above, wherein edges selected for traversal have their traversal status variable changed to reflect that they have been traversed.

4. The apparatus of claim 3 above, wherein the traversal status variables are used to eliminate traversed edges from the random selection of traversal paths.

5. The apparatus of claim 2 above, further comprising means for maintaining one or more references to the traversal status variables.

6. The apparatus of claim 5 above, wherein the means for maintaining further comprises means for maintaining one or more references to edges on a critical path from a base node to a current position in the graph.

7. The apparatus of claim 6 above, wherein the references are used to change the traversal status variables to indicate that the edges on the critical path are not completely traversed when a section of the graph is encountered where there is at least one untraversed edge that cannot be traversed in a current iteration.

8. The apparatus of claim 6 above, further comprising means for determining whether all edges in the graph have been traversed from the traversal status variables for the edges exiting the base node.

9. The apparatus of claim 8 above, wherein the means for determining further comprises means for determining whether all edges of the graph have been traversed when the traversal status variables for all of the edges exiting the base node indicate a complete traversal.

10. A computer-implemented method for performing a complete, randomly ordered traversal of a cyclic directed graph, comprising the steps of:
    (a) creating a cyclic directed graph representation in the computer; and
    (b) iteratively selecting traversal paths through a cyclic directed graph that result in traversal of every edge in the graph in a random order with a minimum number of iterations.

11. The method of claim 10 above, wherein one or more traversal status variables are used to track whether associated edges in the graph have been traversed.

12. The method of claim 11 above, wherein edges selected for traversal have their traversal status variable changed to reflect that they have been traversed.

13. The method of claim 12 above, wherein the traversal status variables are used to eliminate traversed edges from the random selection of traversal paths.

14. The method of claim 11 above, further comprising the step of maintaining one or more references to the traversal status variables.

15. The method of claim 14 above, wherein the step of maintaining further comprises the step of maintaining one or more references to edges on a critical path from a base node to a current position in the graph.

16. The method of claim 15 above, wherein the references are used to change the traversal status variables to indicate that the edges on the critical path are not completely traversed when a section of the graph is encountered where there is at least one untraversed edge that cannot be traversed in a current iteration.

17. The method of claim 15 above, further comprising the step of determining whether all edges in the graph have been traversed from the traversal status variables for the edges exiting the base node.

18. The method of claim 17 above, wherein the step of determining further comprises the step of determining whether all edges of the graph have been traversed when the traversal status variables for all of the edges exiting the base node indicate a complete traversal.

19. A program carrier, readable by a computer, embodying one or more instructions executable by the computer to perform method steps for performing a complete, randomly ordered traversal of a cyclic directed graph, the method comprising the steps of:
    (a) creating a cyclic directed graph representation in the computer; and
    (b) iteratively selecting traversal paths through a cyclic directed graph that result in traversal of every edge in the graph in a random order with a minimum number of iterations.

20. The method of claim 19 above, wherein one or more traversal status variables are used to track whether associated edges in the graph have been traversed.

21. The method of claim 20 above, wherein edges selected for traversal have their traversal status variable changed to reflect that they have been traversed.

22. The method of claim 21 above, wherein the traversal status variables are used to eliminate traversed edges from the random selection of traversal paths.

23. The method of claim 20 above, further comprising the step of maintaining one or more references to the traversal status variables.

24. The method of claim 23 above, wherein the step of maintaining further comprises the step of maintaining one or more references to edges on a critical path from a base node to a current position in the graph.

25. The method of claim 24 above, wherein the references are used to change the traversal status variables to indicate that the edges on the critical path are not completely traversed when a section of the graph is encountered where there is at least one untraversed edge that cannot be traversed in a current iteration.

26. The method of claim 24 above, further comprising the step of determining whether all edges in the graph have been traversed from the traversal status variables for the edges exiting the base node.

27. The method of claim 26 above, wherein the step of determining further comprises the step of determining whether all edges of the graph have been traversed when the traversal status variables for all of the edges exiting the base node indicate a complete traversal.

* * * * *

UNITED STATES PATENT AND TRADEMARK OFFICE
CERTIFICATE OF CORRECTION

PATENT NO.    : 6,189,116 B1
DATED         : February 13, 2001
INVENTOR(S)   : John Thomas Mongan and Dorothy Mack Cribbs It is certified that error appears in the above-identified patent and that said Letters Patent is hereby corrected as shown below:

<u>Column 13,</u>
Line 18, "REPEAST" should read -- REPEAT --;
Line 28, "Circl" should read -- Circle --;
Line 30, "∴}" should read -- {} --.

Signed and Sealed this

Fourth Day of June, 2002

*Attest:*

*Attesting Officer*

JAMES E. ROGAN
*Director of the United States Patent and Trademark Office*